United States Patent

Drake et al.

[11] Patent Number: 6,108,088
[45] Date of Patent: Aug. 22, 2000

[54] APPARATUS AND METHOD FOR TESTING STEERABLE MIRRORS MOUNTED ON OPTICAL HEADS

[75] Inventors: Joseph D. Drake, Palo Alto; Raymond Chin, Santa Clara, both of Calif.

[73] Assignee: Seagate Technology, Inc., Scotts Valley, Calif.

[21] Appl. No.: 09/320,332

[22] Filed: May 26, 1999

Related U.S. Application Data

[60] Provisional application No. 60/088,827, Jun. 10, 1998.

[51] Int. Cl.[7] ................................................. G01B 11/00
[52] U.S. Cl. ................................. 356/372; 356/373
[58] Field of Search .................................. 356/373, 372, 356/138

[56] References Cited

U.S. PATENT DOCUMENTS

| | | | |
|---|---|---|---|
| 5,410,532 | 4/1995 | Ohno et al. | 369/112 |
| 5,619,331 | 4/1997 | Li | 356/394 |
| 5,706,080 | 1/1998 | Pekin et al. | 356/72 |

OTHER PUBLICATIONS

"A High Resolution Laser Based Deflection Measurement System For Characterizing Aluminum Electrostatic Actuators," K Honer et al., (Proceedings of Transducers 1995; Stockholm, Sweden; pp. 308–311).

*Primary Examiner*—Robert H. Kim
*Assistant Examiner*—Philip Natividad
*Attorney, Agent, or Firm*—Edward P. Heller, III; Raghunath S. Minisandram

[57] ABSTRACT

An apparatus designed for the testing of a micro-machined mirror that is mounted onto a flying optical head is described. As in the case of normal operation of the head, laser light is coupled into the head using an optical fiber. The light propagates through the head, is emitted from the fiber, reflects off of the steerable mirror inclined at 45 degrees to the fiber axis, and passes through a focusing lens and exits the head. A position sensitive detector (PSD) is placed so as to detect the position of the light spot as it exits the head. Actuation of the mirror's steering capabilities modulates the spot position, which is detected by the PSD and its associated electronics. The profile of the PSD is made small enough to fit in a space between two opposing optical heads on a head stack assembly (HSA) so that the test can be performed immediately prior to the assembly of the disc drive. An array of such PSD's is constructed so that all of heads on an HSA can be tested simultaneously or in a multiplexed manner.

14 Claims, 5 Drawing Sheets

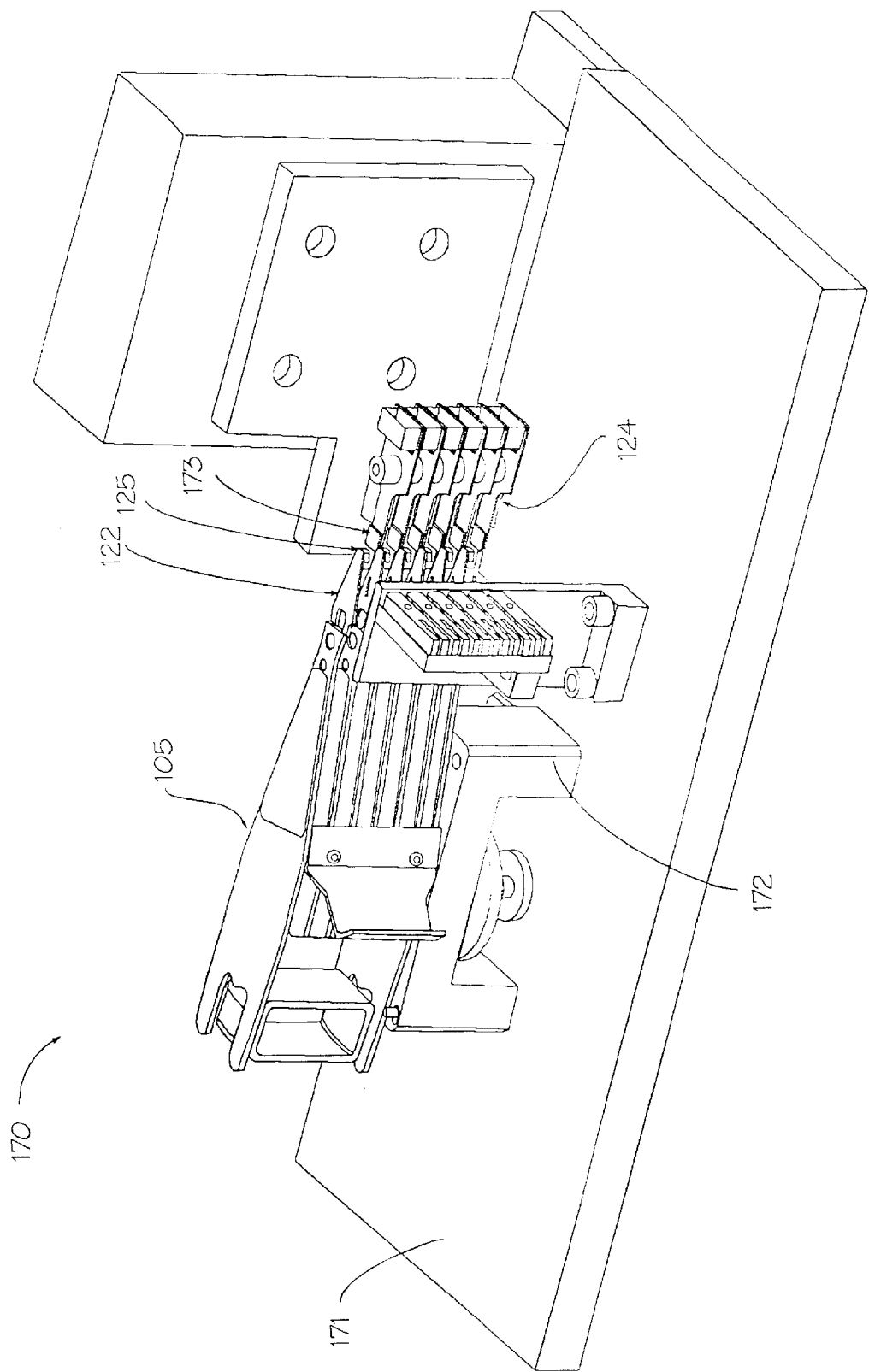

APPARATUS AND METHOD FOR TESTING STEERABLE MIRRORS MOUNTED ON OPTICAL HEADS

This application claims benefit of Provisional appl. 60/088,827 filed Jun. 10, 1998.

FIELD OF THE INVENTION

The present invention is related generally to a head stack testing apparatus and more particularly to a head stack testing apparatus for testing head stacks comprising dynamic components.

BACKGROUND

A new type of flying optical head combines elements from a broad range of technologies including fiber optics, micromachining, Winchester-style slider fabrication, and micro-optics. Besides the initial technological challenge of creating laboratory prototypes of the optical head, there is the additional formidable task of transferring the technology to manufacturing. For production of the flying optical heads to be successful and profitable, the process for their manufacture needs to be inexpensive, repeatable, and well characterized. Testing of the various components of the optical head at strategic points in the assembly process is desired for the characterization of the manufacturing process.

A key component of the optical head introduced above is a steerable micro-machined mirror that has been fully described in commonly assigned patent application "Data Storage System Having an Improved Surface Micro-Machined Mirror" (U.S. Ser. No. 08/844,207). The micro-machined mirror should be tested at the component level prior to assembly onto the optical head. Among the battery of tests that should be performed are the following characterizations:

Functionality: Verification that the steerable micro-machined mirror moves when an actuation voltage is applied to drive electrodes.

Voltage Sensitivity: Characterization of a sensitivity of a deflection angle of the steerable micro-machined mirror as a function of an applied actuation voltage.

Mirror Dynamics: Measurement of modal frequency for torsional excitation of the mirror and its quality factor, Q, for this mode.

Mirrors that pass the desired performance specifications may be used for assembly onto the flying optical head. However, during assembly of the head, the mirror may become damaged and consequently will no longer function as required. Thus, the mirror would need to be retested during and/or after assembly onto the head. In order for assembly costs to be minimized, it is important to identify damaged mirrors as early in the assembly process as possible such that labor is not wasted on non-functioning heads. The small form factor of the head, especially when it is assembled onto a head stack, makes retesting of the steerable micro-machined mirror especially challenging.

Torsional aluminum actuators have been tested on a benchtop environment for angular deflection and dynamics using standard optics as described in a paper by K. Honer, et. al., "A High-Resolution Laser-Based Deflection Measurement System for Characterizing Aluminum Electrostatic Actuators" (Proceedings of Transducers 1995; Stockholm, Sweden; pp. 308–311). This paper describes laser light that is produced by a He—Ne laser with a 500 $\mu$m beam diameter and directed through an attenuator, a beam splitter, and a lens that focuses a spot onto a surface of the actuator. Light reflected off of the actuator surface passes back through the lens and is diverted by the beam splitter onto two photodiodes positioned 100 $\mu$m apart. Upon actuation, the reflected spot position with respect to the position of the two photodiodes is detected as a difference in illumination between the two photodiodes. Reflected spot movement with respect to its position for the undeflected actuator is a function of actuator angular rotation and the focal length of the lens. Standard optical and electronic methods are used to deduce the voltage sensitivity and dynamics of the actuator from measurements of the movement of the reflected spot.

Testing of dynamic optical elements, such as steerable micro-machined mirrors, at the optical head stack level is not addressed by Honer et al. Additionally, Honer et al. rely on normal incidence of a laser light onto an actuator, which is not available on a flying optical head if a steerable micro-machined mirror is positioned at a 45 degree angle with respect to the incoming light's incident propagation axis. Much of the test method of Honer et al. relies on the design and construction of an externally based optical path. The Honer et al. approach does not take into consideration the requirements imposed by the optical path, associated steerable micro-machined mirror, and head stack assembly as described in concurrently assigned patent application Ser. No. 08/844,207. The use of a photodiode pair by Honer et al., makes this test method inherently one-dimensional, that is, only spot movement along the axis defined by the two photodiodes can be detected; transverse movement of the spot cannot be detected.

What is needed, therefore, is a method for testing the performance of dynamic components including micro-machined mirrors that are mounted to an optical head. This method must be compatible with the need for testing the components at various points in the optical head assembly process including, most critically, when an array of such heads has been assembled onto a head stack assembly. The method should take into account and deal with the limited clearance on the head stack available for any components required to perform the test.

SUMMARY OF THE INVENTION

The present invention includes a method and apparatus for testing of a steerable micro-machined mirror that is mounted onto an optical head. As in the case of normal operation of the head, laser light is coupled into the head using an optical fiber. The light propagates through the head, is emitted from the fiber, reflects off of the steerable mirror inclined at 45 degrees to the fiber axis, and passes through a focusing lens and exits the head. A detector is placed so as to detect the position of the light spot as it exits the head. Actuation of the mirror's steering capabilities modulates the spot position, which is detected by the detector and its associated electronics. The profile of the detector is made small enough to fit in a space between two opposing optical heads on a head stack assembly (HSA) so that the test can be performed immediately prior to the assembly of the disc drive. An array of such detectors is constructed so that all of heads on an HSA can be tested simultaneously or in a multiplexed manner.

The present invention may also include an apparatus for testing at least one dynamic component of at least one optical head, comprising: a source of light, said source of light providing a light along an optical path; a mount; at least one detector coupled to said mount for detecting said light; and processing circuitry, said at least one detector coupled to said processing circuitry for detecting said light and providing an output representative of a characteristic of said at least one dynamic component; and said processes circuitry processes said output and provides a result based on said output.

The at least one dynamic component may comprise a displaceable optic, wherein said displaceable optic affects said optical path of said light.

The least one optical component may comprise a steerable micro-machined reflector, wherein said steerable micro-machined reflector alters said optical path of said light, and wherein said steerable micro-machined mirror is disposed in said optical path of said light opposite said at least one detector.

The at least one optical head may comprise a flying optical head.

The at least one detector may comprise a position sensing detector.

The characteristic may comprise a functionality of said steerable micro-machined mirror.

The characteristic may comprise a voltage sensitivity of said steerable micro-machined mirror.

The characteristic may comprise a frequency response of said steerable micro-machined mirror.

The at least one optical head may comprise a plurality of optical heads, wherein said at least one detector is disposed between said plurality of optical heads.

The at least one detector may comprise two detectors.

The plurality of optical heads may comprise a head stack assembly.

The apparatus may comprise a plurality of optical fibers, wherein respective ones of said optical fibers is coupled to respective ones of said optical heads, and wherein said light is delivered from said source to said optical heads by said optical fibers.

The present invention may include an apparatus for testing at least one dynamic component of at least one optical head, comprising: a source of light, said source of light providing a light along an optical path; a mount; detector means for detecting said light and providing an output representative of a characteristic of said dynamic component; and processing means for processing said output to provide a result based on said output from said detector means.

The at least one dynamic component may comprise a steerable micro-machined mirror.

The present invention may include a method of testing a head stack assembly comprising at least one optical head that includes at least one dynamic optical component, comprising the steps of: providing a light along an optical path to said at least one dynamic optical component; providing at least one detector opposite said at least one dynamic optical component; altering said optical path of said light with said at least one dynamic optical component: detecting said light with said at least one detector; and providing an output representative of a characteristic of said at least one dynamic component.

SUMMARY OF THE FIGURES

FIG. 4 illustrates a head stack assembly mounted in the testing apparatus of the present invention.

DETAILED DESCRIPTION OF THE PREFERRED EMBODIMENT

Figure 1:
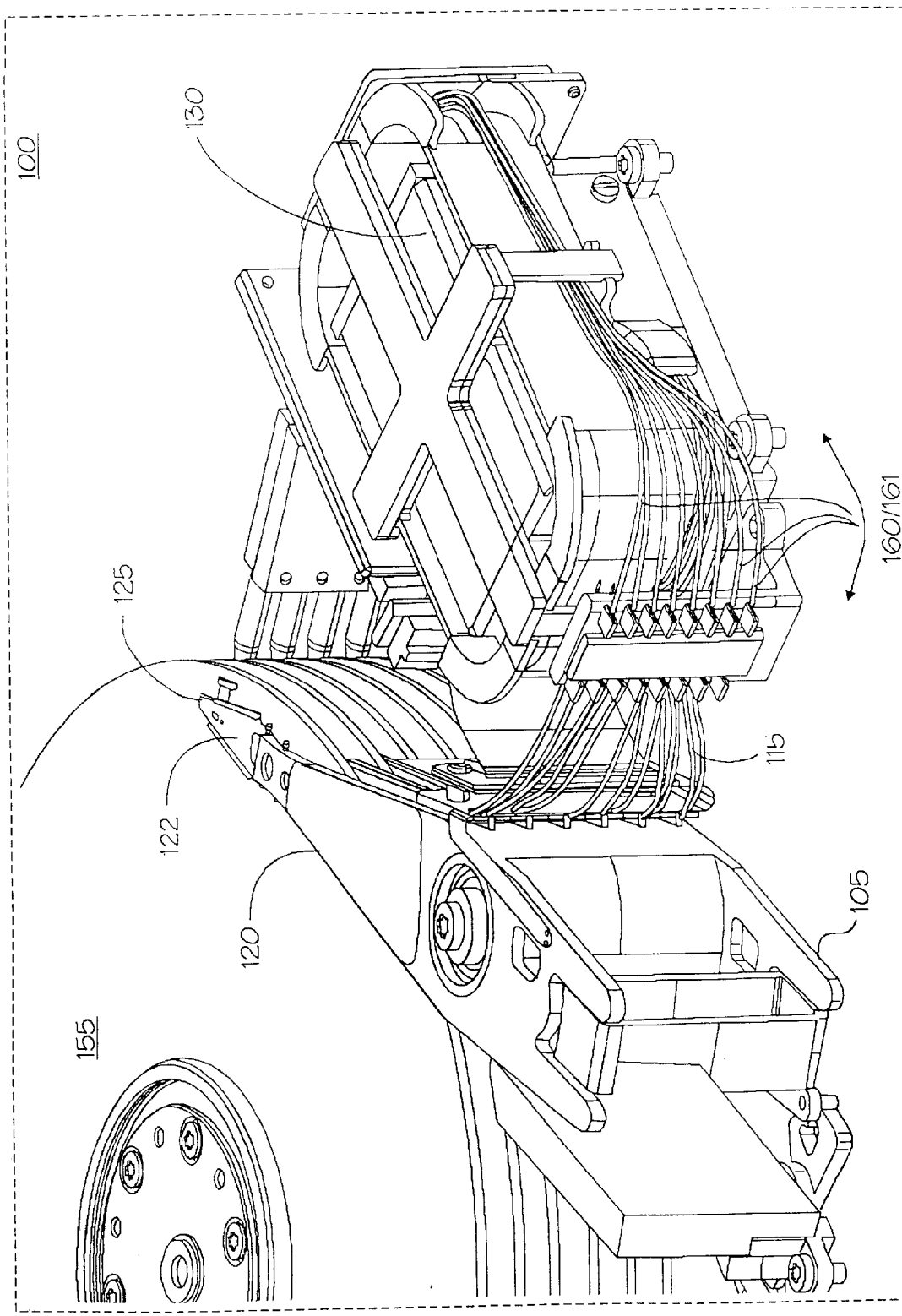
FIG. 1 illustrates a multi-disk drive.

Referring in detail to the drawings wherein similar parts are identified by like reference numbers, there is seen in FIG. 1 a perspective view of a multi-disk optical drive 100. In this view, a head stack assembly 105 comprises individual optical heads 125, each of which is coupled to individual arms 120 through respective suspensions 122. In the preferred embodiment, the optical heads 125 comprise flying optical heads. The optical heads 125 comprise air bearing surfaces of a type well known in the Winchester disc drive arts. The air bearing surfaces interact to maintain the optical heads above respective rotating disks 155. While the present invention is described with reference to flying optical heads, it is understood that non flying optical heads used in the disk drive industry are also with the scope of use with the present invention. The optical heads 125 may also comprise a magneto-optical head embodiment, an embodiment wherein the head may utilize magnetic elements (not shown). FIG. 1 further illustrates a group of individual optical fibers 115, which are all coupled to an optical switch 130 at one end and to individual ones of the optical heads 125 at an opposite end. The optical switch 130 selectively directs a light 160 from a source (not shown) to a particular one of the individual optical fiber 115. The optical fibers 115 function to route the light 160 between the optical switch 130 and a particular optical head 125.

Figure 2A:
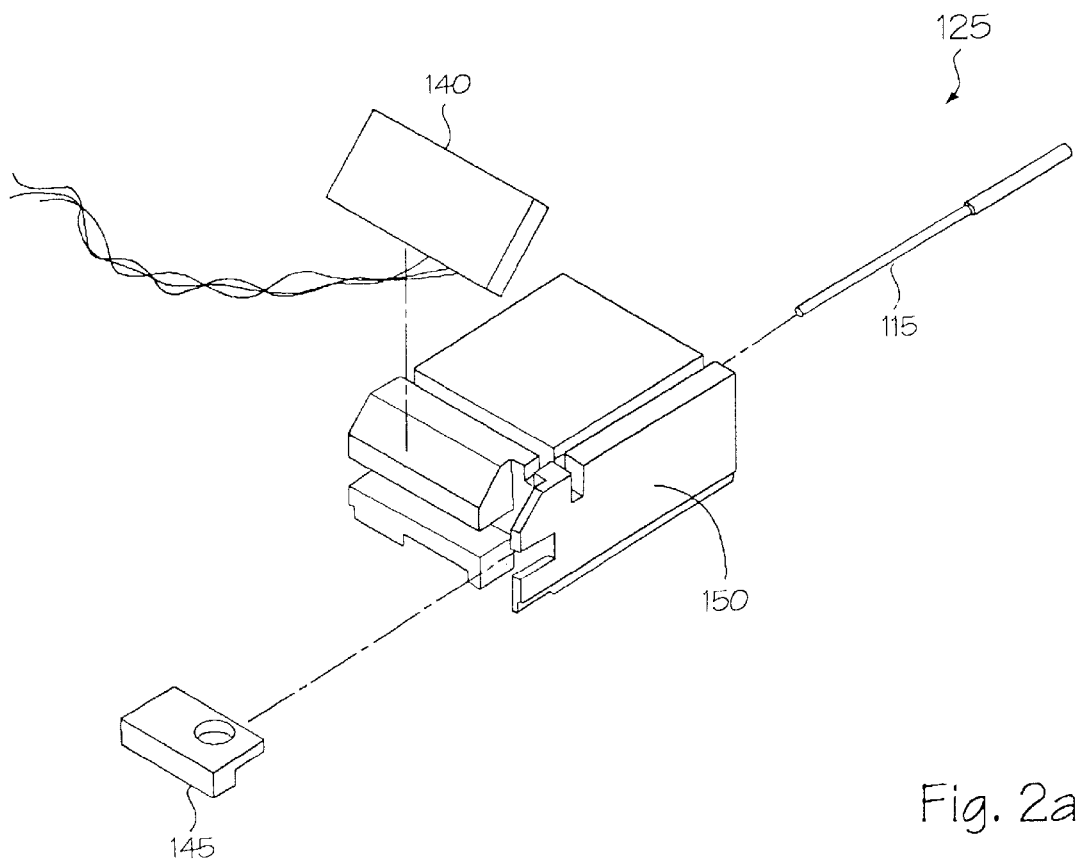
FIG. 2a illustrates an exploded view of an optical head.
Figure 2B:
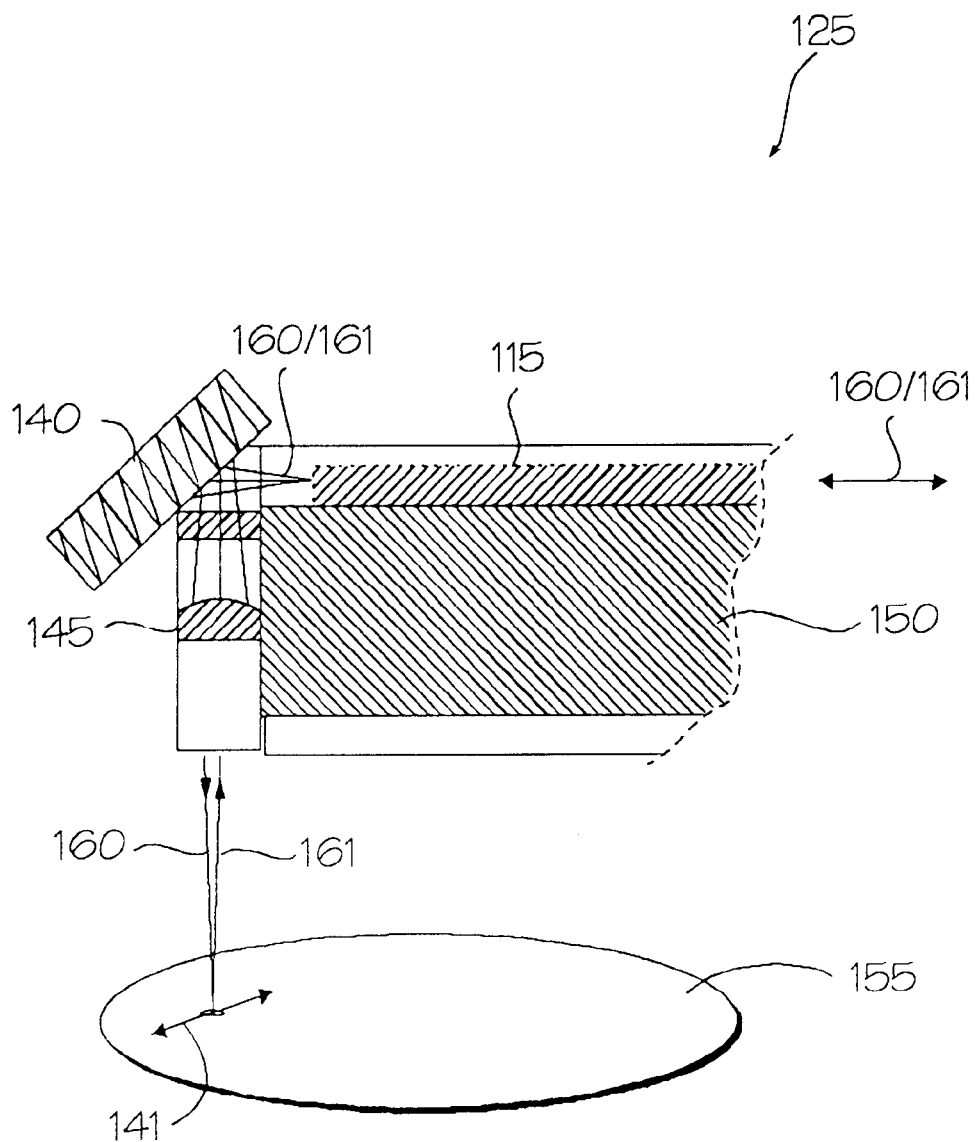
FIG. 2b illustrates a cross-section of an optical head.

Referring now to FIGS. 2a and 2b, there is seen in FIG. 2a an exploded view of an optical head 125 in which is shown attached to a body 150, the optical fiber 115, a steerable micro-machined mirror 140, and a focusing lens 145. Illustrated in FIG. 2b is a cross-section of the optical head 125 and a path of the light as it travels along the optical fiber 115. The light 160 is vectored and reflected by a steerable micro-machined mirror 140 and focused by the lens 145. During normal drive operation, the light 160 is directed by the lens 145 onto a surface of a particular disk 155, and reflected light 161 is returned from the disk 155 to the optical switch 130 for processing by optics and electronics (not shown).

Figure 3:
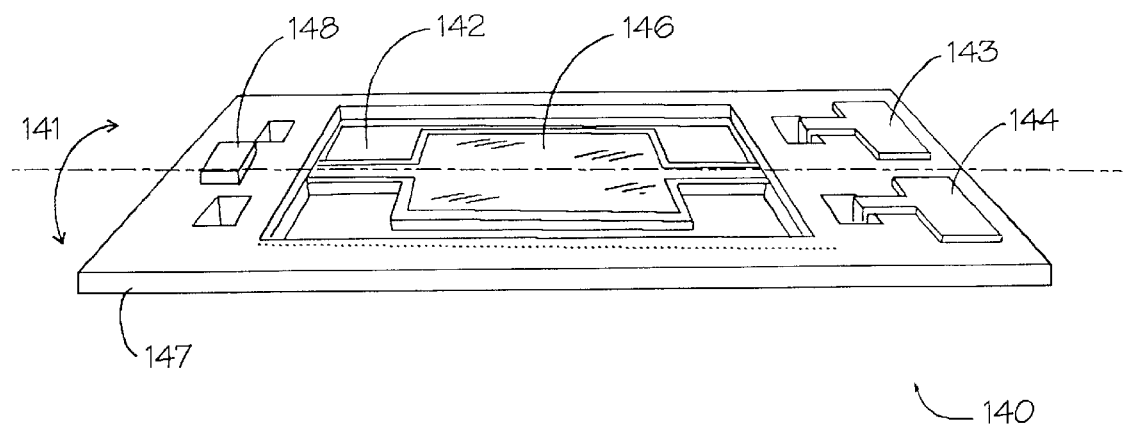
FIG. 3 illustrates a steerable micro-machined mirror.

Referring now FIG. 3, the steerable micro-machined mirror 140 is seen to include a moveable portion 146 attached to a body 147 by beams 142. Bond pads 143 and 144 are connected electrically to drive-electrodes (not shown) located underneath and separated from the moveable portion 146 by an air gap. When a voltage is applied to pad 143 or 144 relative to a ground pad 148, a differential electrostatic force is applied to the moveable portion 146 to cause it to torsionally vector about the beams 142 by a desired angle 141 about axis 149. The mirror 140 is manufactured by utilizing micro-machining techniques and is described in commonly assigned U.S. application Ser. No. 08/844,207, entitled "Data Storage System Having An Improved Surface Micro-Machined Mirror."

Referring now to FIG. 4, there is shown a head stack assembly mounted in the testing apparatus of the present invention. A testing apparatus 170 of the present invention comprises a base 171, a head stack mount 172, at least one detector 173, and a mount 174 for holding the at least one detector 173. During testing the head stack assembly 105 is placed on the test apparatus 170 in a manner such that the at least one detector 173 can be used for testing of optical head(s) 125, as is described below. It is understood that the same optical switch 130 and optical fibers 115 used with the drive 100 may be used to deliver light 160 to the heads 105 during testing. In the preferred embodiment, the at least one detector 173 comprises a position sensitive detector (PSD). PSDs are commercially available as single element devices with an active area of, for example, 3 mm×3 mm PSD available from Advanced Photonix, Inc, Camarillo, Calif. USA 93012. Larger or smaller active areas are also commercially available. Typically, PSDs are sold in packaged form. PSD wafers are typically diced into individual die. The die are mounted to a substrate and wire bonded to provide external electrical connections, and the whole assembly is covered with a transparent material in order to protect it from handling and its environment. Such a package may be on the order of 2.0 mm thick.

Figure 5:
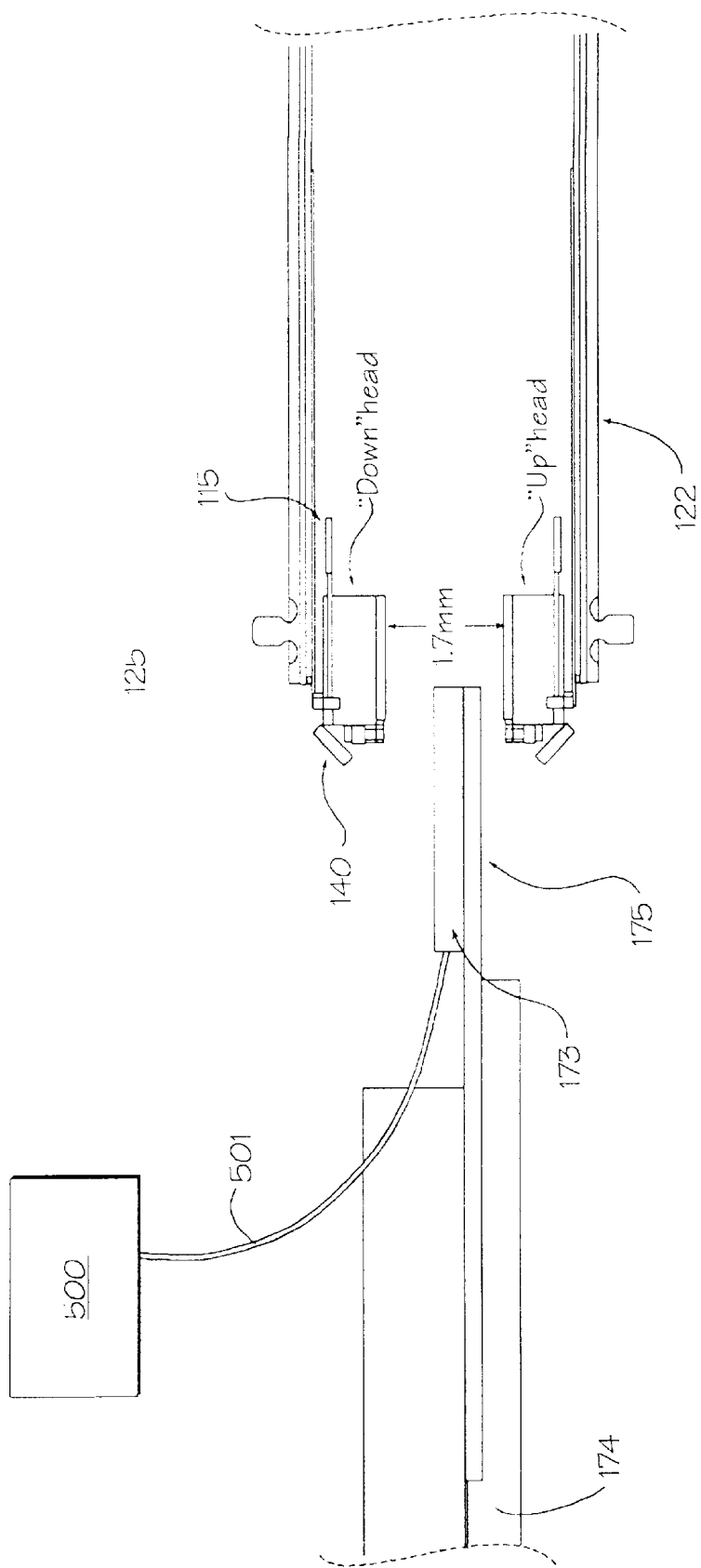
FIG. 5 illustrates a close up view of at least one detector disposed for insertion between optical heads of a head stack to be tested.

Referring now to FIG. 5, there is shown a close up view of the at least one detector 173 disposed for insertion between an up facing and a down facing optical head 125 of a head stack 105 to be tested. Because spacing between opposing optical heads 125 of the head stack 105 to be tested is typically on the order of only 1.7 mm, placement of an off-the-shelf PSD within this spacing may not be possible. However, unpackaged bare PSD dies are available, for example, through special arrangement with a manufacturer of PSD's. These unpackaged PSDs preferably have a narrow enough profile to allow them to fit between opposing optical heads 125 during testing without damaging either of the optical heads. In the preferred embodiment, the at least one detector 173 comprising a bare PSD die is epoxy mounted to a flex circuit 501 which is in turn adhesively attached to a stainless steel substrate 175. The stainless steel substrate 175 is coupled to the mount 174. Preferably, the flex circuit contains wire bond pads for receiving gold wires that have also been wire bonded to the PSD electrodes. Also, on the flex circuit are metal traces with terminating solder pads that provide for the means to connect the flex cable to external processing electronics 500, which are represented as a block diagram that may be implemented by one of ordinary skill in the art. The entire assembly preferably has a profile, for example, approximately 0.8 mm, which allows for its placement in the gap between opposing heads 125. Referring briefly back to FIG. 5, it is seen that an interleaving array of PSD's may be used to test all of the optical heads 125 of the head stack assembly 105. In a 12-head stack embodiment, six PSD assemblies may be slid into position in order to test all of the "up" optical heads 125. These may be retracted and replaced by another six PSD assemblies that are used to test all of the "down" optical heads 125.

It is understood, however, that alternative embodiments may comprise appropriately dimensioned PSDs so that both the "up" heads and "down" optical heads 125 in the head stack 105 could be tested without the need for retracting one bank of PSD assemblies and re-inserting a second bank. Methods for implementing this approach may include for example: an assembly wherein flex circuits are adhesively attached to both sides of the stainless steel substrate 175. Two PSD's may then be attached to the flex circuits, with the "bottom" side PSD active area inverted with respect to the "top" side PSD. To accommodate the additional thickness represented by a second flex circuit and PSD pair, the PSD wafer may be thinned from 0.5 mm to, for example, 0.2 mm, prior to chip separation. In yet another implementation, a side-by-side PSD assembly could be used, wherein the stainless steel substrate 175 could be fabricated with side-by-side depressions arranged on opposite sides of the substrate. The flex circuits could then be adhesively attached to the substrate 175 at the depression locations. One PSD could thus be disposed in a depression on one side of the substrate; alongside this PSD but on the opposite side of the substrate, the other PSD could be disposed in the other depression with its active area inverted with respect to that of the first PSD. In this configuration, the "up" facing heads could be aligned to their PSD's and tested by moving the array of PSDs or head stack assembly 105. Next, the head stack assembly or array of PSDs could be translated to allow for alignment of the "down" facing heads to a different set of PSD's such that these heads could then be tested.

Additional embodiments of this invention with respect to the arrangement of PSD's relative to the position of the optical heads 125 on the head stack assembly 105, with respect to alternative detection approaches (e.g. photodiodes), with respect to the amplification circuitry, and with respect to alternative instruments used for measuring the PSD amplifier outputs (e.g. computer-controlled data acquisition boards) are extensions to the described invention and could be implemented by one practiced in the arts of optical detection, electronic instrumentation, and disc drive fabrication.

The operation of PSDs is well understood by those practiced in the art of photo-detection. Upon illumination by a light, such as a focused light 160, charge is generated within an active region of the PSD. For a one-dimensional PSD, the charge is driven through a resistive layer towards two electrodes positioned on opposite sides of the rectangular active area. Because the resistivity of this layer is uniform, the current collected at an electrode is inversely proportional to the distance between the incident light and the electrode. Measurement of the relative magnitudes of the currents collected at the two electrodes allows for determination of the position of the light between them. A two-dimensional PSD operates in a similar manner except that a second pair of electrodes traverses the other pair of electrodes so that the position of the spot can be determined with respect in two orthogonal dimensions.

For use in the present invention, external circuitry is connected to the PSD in order to provide a supply voltage (for example, +5V or −5V, depending on the PSD's structure) and to amplify the current at the electrodes. A typical 2-stage amplification approach may involve an initial transimpedance amplification stage that converts the electrode current into a voltage proportional to its magnitude. For a one-dimensional PSD, the second stage is used to compute both the difference and the sum of the first stage outputs. An additional sum and difference channel is included to provide the corresponding values for the second axis of a two-dimensional PSD. Optionally, this second stage can provide additional amplification of the first stage signals. The difference output of the second stage provides light position information for that axis of the PSD. If desired, this difference output can be divided by the summing output of the second stage to provide normalization of the position information as well as to reduce the influence of light intensity fluctuations.

As can be deduced from the preceding description, a null difference signal may be generated to indicate that the light 160 is positioned at the center of the PSD; negative values would correspond to the light falling on one side of the PSD and positive values would correspond to the PSD's other side.

Referring back to FIG. 2*b*, during normal operation of the drive 100, the light 160 is coupled from free space onto a core of a particular optical fiber 115. The light 160 propagates down the length of the optical fiber 115, exits the opposite end of the optical fiber 115, and impinges on a reflective surface of the moveable portion 146 of the steerable micro-machined mirror 140. The moveable portion 146 reflects the light 160 at a right angle (with respect to the optical axis of the optical fiber 115) down through the lens 145. The lens 145 is a micro-lens designed to focus the light 160 below the optical head 125 to a small diameter spot on a surface of the storage disk 155.

The path of the light 160 is the same during testing with the exception that the PSD is positioned with respect to the optical head 125 as is shown in FIG. 1, such that light exiting the head will fall on the active area of the PSD. Observation and maximization of the summing output of the PSD amplifier, while positioning the end of the optical fiber 115 with respect to the light 160, allows for determination of optimal coupling of the laser light into the fiber. Application of the drive voltage to the pads 143/144 of the steerable micro-machined mirror 140 causes the focused light 160 to move within the PSD active area; this movement may be measured as the difference output of the PSD.

Thus, the present invention provides that testing of the steerable micro-machined mirror 140 can be done in a manner fundamentally similar to the testing done at the mirror chip level, but while mounted as part of the head stack assembly 105. Testing in this manner enables the optical drive 100 to be manufactured and tested in a more efficient and economically feasible manner, while taking into account constraints and limitations imposed by the optical drive. During testing, the drive voltage may be applied in the form of a square wave that oscillates between 0 volts and 100–200 volts at a frequency of, say, 500 Hz. It is understood, however, that other combinations of waveform shape, amplitude, offset, and frequency can be used, as would be apparent to one schooled in the art. By monitoring the difference output of the PSD, for example, with a digitizing oscilloscope (Tektronix Model 420A or equivalent), the following tests of the steerable micro-machined mirror 140 may be performed:

Functionality: A drive voltage may applied to the one electrode of the steerable micro-machined mirror 140 with the opposite electrode and center ground pad grounded. The output of the detector 173 may be monitored to verify that the difference signal is modulated in phase with the drive voltage to the steerable micro-machined mirror 140. Next, the drive voltage may be applied to the other electrode of the steerable micro-machined mirror 140 with the opposite electrode and center ground pad grounded. The difference signal from the detector 173 may again be monitored to verify that it is modulated in phase with the drive signal. During testing it should be noted that modulation caused by actuation of the left side of the mirror should be of the opposite direction than that caused by actuation of the right side of the mirror.

Voltage Sensitivity: The magnitude of the modulated difference signal from the detector 173 will preferably be proportional to the distance the spot moves across the active detection area of the detector. Thus, the magnitude of the modulation of the difference signal with respect to the amplitude of the drive voltage will preferably provide a measure of the voltage sensitivity for the steerable micromachined mirror 140.

Mirror Dynamics: The frequency response of the steerable micro-machined mirror 140 can be determined by first applying a square wave to one side of the mirror. The difference signal from the detector 173 will preferably represent the step response of the steerable micro-machined mirror 140. The step response may be differentiated to find the impulse response. A FFT algorithm applied to the impulse response will preferably yield a frequency response of the steerable micro-machined mirror 140. Resonant frequency and quality factor may be determined from the calculated frequency response as is widely understood in the industry. Alternatively, a commercially available spectrum analyzer in place of the oscilloscope can make the measurement in a case where the drive voltage would be a small ac signal superimposed on a larger dc offset voltage.

The detector 173 comprising a PSD used in this application may be of a one-dimensional variety such that its active detection area could be aligned for measurement of linear displacement of the light 161, or, alternatively, a two dimensional PSD could be used to provide information on any off-axis motion of the steerable micro-machined mirror 140.

It should be noted that a direct correlation of the difference signal from the PSD amplifier to the angular position of the steerable micro-machined mirror 140 will be a function of the design of the PSD used, the properties of the optical fiber 115, the properties of the lens 145, and the geometrical details of the optical path within the optical head 125. One schooled in the art of optics design can provide such a calculation. As is clear from the above description, such a correlation is not necessary for proper implementation of the "Functionality" test. Similarly, the "Mirror Dynamics" test does not require this correlation because the output of the FFT algorithm or spectrum analyzer is typically normalized to unity gain at dc. "Voltage sensitivity" would, in general, require such a correlation for accurate measurements of angular deflection of the steerable micro-machined mirror 140. In a manufacturing environment, a simple relative measurement of this value from head to head would be sufficient for most process control approaches.

It should also be noted that the size of the spot that impinges on the surface of the PSD and the range of its movement across the active area will be dependent on distance between the PSD and the lens 145. The larger the distance from the focal point of the lens 145, the larger the spot size of the focused light 160 and the larger the apparent spot movement. PSD's have a lower bound on usable spot size, with best performance given when the spot diameter is on the order of a few hundred microns. In an exemplary embodiment of the present invention, the focused spot is less than a micron in diameter. Also, the upper bound of the spot diameter is based on the premise of insuring that the spot is fully located within the active area of the PSD even when the steerable micro-machined mirror 140 is fully deflected. Hence, repeatable placement (head to head) of the PSD with respect to the air-bearing surface may need to be taken into account. In prototypes of the present invention it has been found that suitable control of the PSD position with respect to the air-bearing surface of the optical head 125 could be attained without unreasonable tolerances prescribed to the mounting hardware.

Other features and advantages of the present invention may become apparent to a person of skill in the art who studies the present invention disclosure. For example, the optical head 125 may comprise other dynamic optical components that could be used with the present invention, including linearly and rotationally displaceable optics, such as lenses and the like. Therefore, the scope of the present invention is to be limited only by the following claims.

What is claimed is:

1. An apparatus for testing at least one dynamic optical component of at least one optical head, comprising:
   a source of light, said source of light providing a light along an optical path;
   a mount;
   at least one detector coupled to said mount for detecting said light; and
   processing circuitry, said at least one detector coupled to said processing circuitry for detecting said light and providing an output representative of a characteristic of said at least one dynamic optical component; wherein said processing circuitry processes said output and provides a result based on said output; wherein said at least one dynamic optical component comprises a steerable micro-machined reflector, wherein said steerable micro-machined reflector alters said optical path of said light, and wherein said at least one detector is disposed in said optical path of said light opposite said steerable micro-machined reflector.

2. An apparatus for testing at least one dynamic optical component of at least one optical head, comprising:
   a source of light, said source of light providing a light alone an optical path,
   a mount;
   at least one detector coupled to said mount for detecting said light;
   processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said at least one optical head comprises a flying optical head.

3. An apparatus for testing at least one dynamic optical component of at least one optical head, comprising:
   a source of light, said source of light providing a light along an optical path;
   a mount;
   at least one detector coupled to said mount for detecting said light;
   processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said at least one detector comprises a position sensing detector.

4. An apparatus for testing at least one dynamic optical component of at least one optical head, comprising:
   a source of light, said source of light providing a light along an optical path;
   a mount;
   at least one detector coupled to said mount for detecting said light;
   processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said characteristic comprises a functionality of said steerable micro-machined reflector.

5. An apparatus for testing at least one dynamic optical component of at least one optical head, comprising:
   a source of light, said source of light providing a light along an optical path;
   a mount;
   at least one detector coupled to said mount for detecting said light;
   processing circuitry, said at least one detector coupled to said processing circuitry for detecting said light and providing an output representative of a characteristic of said at least one dynamic optical component: wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said characteristic comprises a voltage sensitivity of said steerable micro-machined reflector.

6. An apparatus for testing at least one dynamic optical component of at least one optical head, comprising:
   a source of light, said source of light providing a light along an optical path;
   a mount;
   at least one detector coupled to said mount for detecting said light;
   processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said characteristic comprises a frequency response of said steerable micro-machined reflector.

7. An apparatus for testing at least one dynamic optical component of at least one optical head, comprising:
   a source of light, said source of light providing a light along an optical path;
   a mount;
   at least one detector coupled to said mount for detecting said light;

processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; and wherein said at least one optical head comprises a plurality of optical heads, wherein said at least one detector is disposed between said plurality of optical heads.

8. The apparatus as recited in claim 7, wherein said at least one detector comprises at least two detectors.

9. An apparatus for testing at least one dynamic optical component of at least one optical head, comprising:

a source of light, said source of light providing a light along an optical path;

a mount;

at least one detector coupled to said mount for detecting said light;

processing circuitry, said at least one detector coupled to said processing circuitry for detecting said light and providing an output representative of a characteristic of said at least one dynamic optical component; wherein said at least one dynamic optical component comprises a steerable micro-machined reflector, wherein said steerable micro-machined reflector alters said optical path of said light, wherein said at least one detector is disposed in said optical path of said light opposite said steerable micro-machined reflector; wherein said processing circuitry processes said output and provides a result based on said output; wherein said at least one optical head comprises a plurality of optical heads, wherein said at least one detector is disposed between said plurality of optical heads, and wherein said plurality of optical heads comprise a head stack assembly.

10. The apparatus as recited in claim 9, wherein said apparatus comprises a plurality of optical fibers, wherein respective ones of said optical fibers is coupled to respective ones of said optical heads, and wherein said light is delivered from said source to said optical heads by said optical fibers.

11. An apparatus for testing at least one dynamic component of at least one optical head, comprising:

a source of light, said source of light providing a light along an optical path;

a mount;

detector means for detecting said light and providing an output representative of a characteristic of said dynamic component;

processing means for processing said output to provide a result based on said output from said detector means; and wherein said at least one dynamic component comprises a steerable micro-machined mirror.

12. A method of testing a head stack assembly comprising at least one optical head that includes at least one dynamic optical component, comprising the steps of:

providing a light to said at least one dynamic optical component along an optical path;

providing at least one detector opposite said at least one dynamic optical component;

altering said optical path of said light with said at least one dynamic optical component;

detecting said light with said at least one detector;

providing an output representative of a characteristic of said at least one dynamic optical component; wherein said at least one dynamic optical component comprises a micro-machined reflector; and wherein said characteristic comprises a functionality of said micro-machined reflector.

13. A method of testing a head stack assembly comprising at least one optical head that includes at least one dynamic optical component, comprising the steps of:

providing a light to said at least one dynamic optical component along an optical path;

providing at least one detector opposite said at least one dynamic optical component;

altering said optical path of said light with said at least one dynamic optical component;

detecting said light with said at least one detector;

providing an output representative of a characteristic of said at least one dynamic optical component; wherein said at least one dynamic optical component comprises a micro-machined reflector; and wherein said characteristic comprises a voltage sensitivity of said micro-machined reflector.

14. A method of testing a head stack assembly comprising at least one optical head that includes at least one dynamic optical component, comprising the steps of:

providing a light to said at least one dynamic optical component along an optical path;

providing at least one detector opposite said at least one dynamic optical component;

altering said optical path of said light with said at least one dynamic optical component;

detecting said light with said at least one detector;

providing an output representative of a characteristic of said at least one dynamic optical component; wherein said at least one dynamic optical component comprises a micro-machined reflector; and wherein said characteristic comprises a frequency response of said micro-machined reflector.

* * * * *